Dec. 7, 1948.    J. L. YONKERS    2,455,544
PIPE COUPLING
Filed July 26, 1947
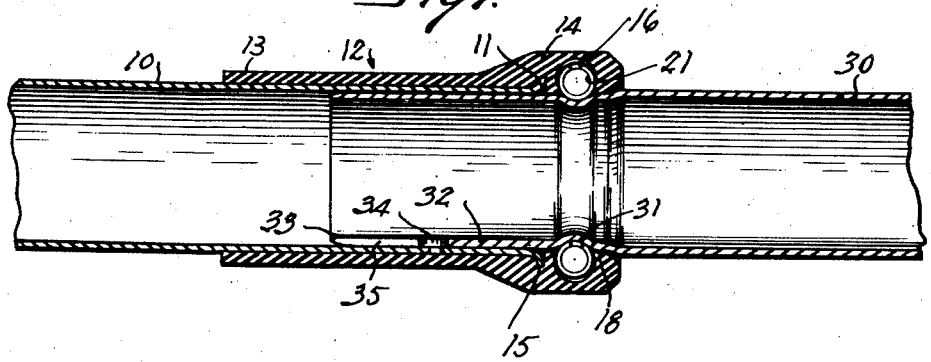
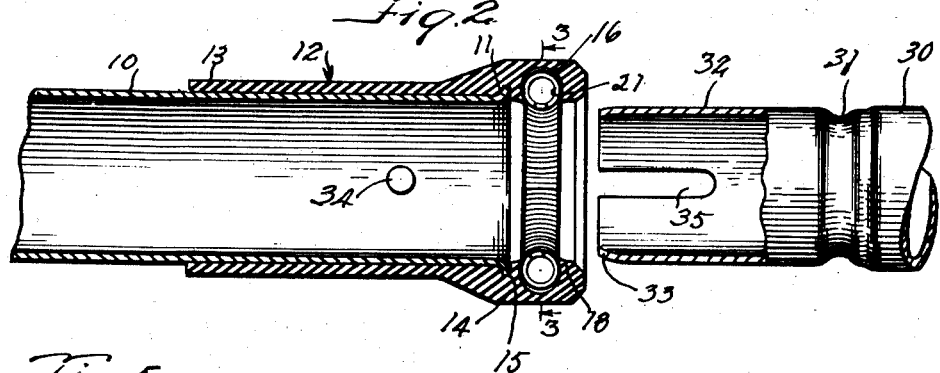
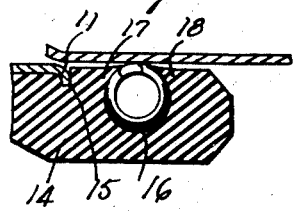
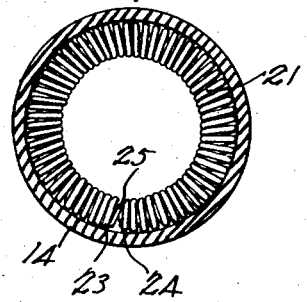
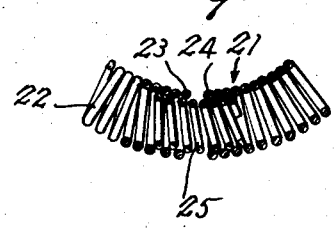
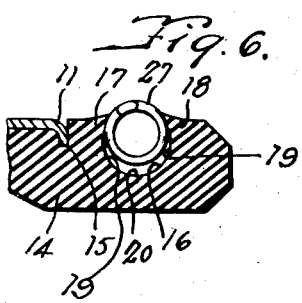
Inventor:
John Yonkers
By: Robert L. Kahn
Atty.

Patented Dec. 7, 1948

2,455,544

UNITED STATES PATENT OFFICE 2,455,544

PIPE COUPLING

John L. Yonkers, Northbrook, Ill.

Application July 26, 1947, Serial No. 763,851

6 Claims. (Cl. 285—169)

This invention relates to a pipe coupling for use in low-pressure air systems and particularly for use in suction cleaning systems. While a coupling embodying the invention may be used generally with all kinds of suction-cleaning systems, it is particularly useful with suction cleaners of the type used in homes, offices, etc., where an operator manipulates a suction cleaner and attachments. A coupling embodying the invention is especially well suited for use in tank-type suction cleaners, examples of which are disclosed and claimed in Yonkers Patents 2,198,568; 2,242,277 and 2,242,278.

As is well known, suction cleaner attachments and hose or pipe are frequently changed during cleaning. It is, therefore, of great importance that a coupling permit easy and quick connection and disconnection. In many instances, the operator is unskilled and lacks mechanical ability. It is, therefore, important that the coupling be mechanically simple and easy to manipulate. Couplings requiring substantial force to operate or inconvenient to manipulate are responsible for improper cleaning procedure and constitute a serious deterrent to the full and effective use of attachments.

Couplings for suction cleaners must be simple and rugged in order to withstand abuse. In particular, it is important that couplings be incapable of improper assembly, which might result in jamming or breakage of parts. It is also essential that suction cleaner couplings have a long, useful life and operate at maximum efficiency at all times.

A coupling embodying the present invention fulfills the above requirements to a remarkable degree. In addition, this coupling is easy and economical to manufacture, requires a minimum of investment in special tools and permits of quick and economical replacements of any parts. In fact, the assembly of the coupling parts is so simple and requires no special tools so that it is practical for a user to make any replacements himself after receiving any required parts. Thus, renewals of couplings are cheap, free of service calls and makes it possible to extend the life of the couplings indefinitely.

In general, this invention provides a coupling having telescoping pipe parts retained in position by a circumferentially elastic ring member cooperating with an annular groove on the small pipe. The coupling embodying the present invention additionally provides a construction whereby, in the coupled position, the elastic ring cooperates with a portion of the structure to provide sealing action. As is well understood, the cooperating coupling parts proper may be attached to any pipes, hose, attachments or the like to permit ready connection and disconnection.

In order that the invention may be understood, it will be explained in connection with drawings wherein Figure 1 is a sectional elevation through the center of a coupling embodying the present invention, showing the coupling in connected position. Figure 2 is a view similar to Figure 1 showing the coupling disconnected. Figure 3 is a sectional view on line 3—3 of Figure 1. Figure 4 is a detail, partly in section, of the garter spring, showing the locking spring. Figure 5 is a sectional detail showing the relative position of the garter spring, sleeve and surface of inserted pipe in a position of the coupling where engaging occurs but prior to full coupling. Figure 6 is a sectional detail similar to Figure 5 but showing the relationship of the parts in a disconnected position.

Referring to the drawings, pipe or hose 10 may be of metal, plastic or rubber and may be rigid or flexible as desired. Preferably, the material is rigid. Pipe 10 has end 11 flared outwardly and the end portion of the pipe is covered by sleeve 12 of rubber or similar flexible material. Sleeve 12 has elongated body 13 and end portion 14. Body 13 may be as thin as desired to fit snugly around pipe 10. End portion 14 has substantial thickness and has moulded therein interior annular slot 15 into which flared pipe edge 11 fits. Thus, sleeve 12 may be locked against longitudinal movement with respect to pipe 10. If desired, flared portion 11 and slot 15 may be omitted and reliance had upon friction or other locking means between body portion 13 and pipe 10.

End portion 14 of the sleeve is relatively massive and has formed therein annular channel 16 beyond the free end of pipe 10. The distance between slot 15 and channel 16 is unimportant and will depend among other things upon the dimensions of end portion 14, flexibility of rubber or other material used in moulding sleeve 12, and the general engineering details of the coupling. Normally, the sleeve is moulded so that the inner surface of body 13 and end 14 are one continuous cylindrical surface. However, when body 13 is stretched over pipe 10, its diameter will be increased. Channel 16 is so shaped as to provide a narrow annular throat connecting the channel with the space enclosed by end portion 14 as a whole, the throat being defined by annular lips 17 and 18. Channel 16 itself is defined by side walls 19 and bottom 20.

Lying in channel 16 of the sleeve is toroidal or garter spring 21 formed from coil spring 22 having ends 23 and 24 connected together to provide a garter spring. Spring 21 is of spring steel or other material and is circumferentially expansible. The means for locking the ends of the coil spring to maintain the garter spring shape is here shown as coil spring 25 disposed within opposed ends 23 and 24 of coil spring 22. Locking spring 25 normally has an outside diameter somewhat larger than the inside diameter of coil spring 22. Spring 25 is forced into the ends of spring 22 to provide a threaded interlocking effect and maintain garter spring 21.

The outside diameter of coil spring 22 and inside diameter of garter spring 21 are so selected that in a coupled (and also disconnected) position, the garter spring presses against lips 17 and 18 and assumes a position generally as shown in Figures 1, 2 and 6. The outside diameter of coil spring 22 is small enough to space bottom 20 and side walls 19 of moulded channel 16 away from the coil spring and leave a crescent-shaped annular region. The garter spring has annular portion 27 (Figure 6) which normally bulges or extends inwardly beyond lips 17 and 18 of sleeve 14. It is preferred to have sleeve 14 around moulded channel 16 sufficiently stiff so that wedge-shaped lips 17 and 18 hug the garter spring.

The inside diameter of the garter spring, when freely contracted, as shown in Figure 2 for example, is less than the inside diameter of pipe 10. The cooperating portion of the coupling comprises pipe 30 which may also be of metal, plastic or other material and, while preferably rigid, may have some flexibility. This cooperating portion has an outside diameter somewhat smaller than the inside diameter of pipe 10 to provide a smooth telescopic fit. Cooperating pipe 30 has formed therein annular circumferential groove 31 having a generally arcuate cross-sectional shape. The curvature of groove 31 is preferably about the same as that of the coils making up the garter spring. The outside diameter of pipe 30 at the trough of groove 31 may be somewhat greater than the inside diameter of the garter spring when freely contracted, as shown in Figure 2. Groove 31 is sufficiently far from the free end of pipe 30 to permit portion 32 of the pipe to extend beyond the coupling and into a portion of pipe 10.

The outside diameter of portion 32 of the pipe is greater than the inside diameter of garter spring 21 when freely contracted, as shown in Figure 2. For facilitating the introduction of pipe portion 32 into the annular spring and expanding the latter, pipe portion 32 may have free edge 33 curled inwardly.

When pipe portion 32 is first inserted into the sleeve and garter spring, the outer surface of the pipe is gripped by a thin annular region of the garter spring. In this position (Figure 5) the garter spring is expanded circumferentially and is forced deeper into moulded channel 16. In this expanded position of the spring, the coils of the spring relax their pressure against lips 17 and 18 and permit these lips to bend toward each other. Thus, lips 17 and 18 move substantially clear of the outer surface of pipe portion 32. In practice, the friction between the garter spring and the outer surface of pipe portion 32 may be quite small, particularly if the pipe surface is smooth and polished. When groove 31 is reached by the garter spring, the spring contracts and forces lips 17 and 18 outwardly of the channel toward the axis of the sleeve (Figure 1).

The outside diameter of the pipe at the trough of the groove may be made any desired value over a substantial range so that the garter spring retains a tight hold on the pipe in the coupled position as shown in Figure 1. At the same time, the engagement of lips 17 and 18 with the surface of the pipe on both sides of the annular groove provide tight seals against air leakage. Since the garter spring tends to maintain the coupling in assembled position due to the cam action of the spring and groove, it is clear that the groove depth may be such as to permit the garter spring to freely contract similar to when the coupling is disconnected, as in Figure 2. This may be desirable in case maximum lip pressure for seals is desired and also in case a strong locking action is desired. However, it is possible that only partial contraction of the garter spring may be desired in the coupled position.

In many instances, it may be desirable to prevent relative rotation between pipes 10 and 30 when the two are in coupled position. To this end, pipe 10 may be provided with rivet 34 while pipe portion 32 may have one or more slots or depressions 35. By providing a plurality of slots 35 circumferentially spaced around pipe 32, locking action in any one of a number of different positions may be effected.

Garter spring 21 may be inserted into channel 16 or removed therefrom by deforming the spring or sleeve or both, as the case may be. In practice, end 14 may be deformed out of round and the spring ring manipulated to remove the same from the sleeve. The spring may be inserted in the sleeve by deformation of the two and working one in proper position with respect to the other.

Instead of a garter type of spring, it is possible to use other forms of expansible spring rings. Thus, a spring wire or ribbon bent to form one or two complete turns around the sleeve axis may be used. The ends would be left free.

I claim:

1. A pipe coupling for suction cleaners and the like comprising one pipe portion having a free end, a flexible sleeve disposed over said pipe portion and having a part extending beyond the free end of the pipe, said sleeve part having an annular channel therein, said channel having opposed lips at the inside sleeve face for defining an annular throat connecting said channel and the space enclosed by said sleeve portion, a metal garter spring in said channel adapted for circumferential expansion, said ring when freely contracted having an annular part beyond the throat, said freely contracted garter ring having an inside diameter smaller than the inside diameter of said one pipe portion and crowding said lips toward the sleeve axis, said sleeve having sufficient body so that the lips hug said spring at all times, a second cooperating pipe portion having an outside diameter less than the inside diameter of the first pipe portion for telescoping therewith, said second pipe portion having an annular groove formed on the outside thereof at a distance from the end thereof, the ouside diameter of said second pipe portion being greater than the inside diameter of the freely contracted garter spring so that said ring is expanded when around the ungrooved part of the pipe with said lips substantially clearing said second pipe surface, said garter spring contracting at the grooved portion of said pipe to maintain the coupling in locked position with said lips being pressed against the pipe material to form seals.

2. The structure of claim 1 wherein interlocking means are provided on the two pipe sections for preventing rotation of one pipe with respect to the other when in coupled relation.

3. The structure according to claim 1 wherein said first pipe is rigid and the free edge thereof is flared outwardly and is locked into an annular channel formed in said sleeve to lock said sleeve against longitudinal displacement with respect to said first pipe.

4. The structure according to claim 1 wherein said second pipe portion has an elongated slot extending from the free end thereof lengthwise along the pipe for a predetermined distance and wherein the one pipe has a protuberance adapted to interfit in said slot for locking the two pipe portions against rotation when coupled.

5. The structure according to claim 1 wherein said garter spring comprises a first coil spring bent to form a toroid, and a second coil spring locked into the two ends of said first coil spring to maintain the toroidal shape thereof.

6. The structure according to claim 1 wherein said garter spring comprises a first coil spring to form a toroid, a second coil spring locked into the ends of said first coil spring to maintain the toroidal shape thereof, said one pipe portion having a protuberance extending inwardly of the pipe and wherein the second pipe portion has a slot for cooperation with said protuberance for locking the two pipe portions against rotation when coupled.

JOHN L. YONKERS.

REFERENCES CITED

The following references are of record in the file of this patent:

UNITED STATES PATENTS

| Number | Name | Date |
| --- | --- | --- |
| 2,111,956 | Baldwin | Mar. 22, 1938 |

FOREIGN PATENTS

| Number | Country | Date |
| --- | --- | --- |
| 467,954 | Germany | Dec. 29, 1926 |